United States Patent
Gripenberg et al.

(10) Patent No.: US 6,989,043 B2
(45) Date of Patent: Jan. 24, 2006

(54) METHOD AND AN APPARATUS FOR RECOVERY OF METALS

(75) Inventors: Henrik Gripenberg, Taby (SE); Joachim Von Scheele, Taby (SE)

(73) Assignee: AGA Aktiebolag, Lidingo (SE)

(*) Notice: Subject to any disclaimer, the term of this patent is extended or adjusted under 35 U.S.C. 154(b) by 268 days.

(21) Appl. No.: 10/258,686

(22) PCT Filed: May 3, 2001

(86) PCT No.: PCT/SE01/00947

§ 371 (c)(1),
(2), (4) Date: Feb. 3, 2003

(87) PCT Pub. No.: WO01/86011

PCT Pub. Date: Nov. 15, 2001

(65) Prior Publication Data

US 2003/0136226 A1 Jul. 24, 2003

(30) Foreign Application Priority Data

May 3, 2000 (SE) .............................................. 0001661

(51) Int. Cl.
C22B 7/02 (2006.01)

(52) U.S. Cl. ........................................................ 75/754
(58) Field of Classification Search ................... 75/754, 75/751

See application file for complete search history.

(56) References Cited

U.S. PATENT DOCUMENTS

| 4,358,310 A |   | 11/1982 | Sanzenbacher et al. |
| 4,613,371 A | * | 9/1986  | Cheney et al. ................. 75/255 |
| 4,654,076 A |   | 3/1987  | Camascho et al. |
| 5,108,496 A |   | 4/1992  | Gut et al. |
| 6,001,148 A |   | 12/1999 | Okamoto et al. |

FOREIGN PATENT DOCUMENTS

| EP | 0618419 A1 | * | 10/1994 |
| EP | 0623684 A2 | * | 11/1994 |

OTHER PUBLICATIONS

Patent Abstracts of Japan Publication No. 08–295956 Date of Publication of Application Dec. 11, 1996.*

* cited by examiner

*Primary Examiner*—Melvyn Andrews
(74) *Attorney, Agent, or Firm*—Pearne & Gordon LLP

(57) ABSTRACT

A method for recovery of metals from essentially metallic fines comprises the following steps: supplying said essentially metallic fines to a flame of a burner (20), bringing said fines to agglomerate by means of heat from the flame without essentially changing the chemical composition thereof, thereby providing an essentially metallic agglomerated product. The agglomerated product is subsequently recovered, preferably in a furnace (30). By means of the method, the recovery of metals is facilitated. An apparatus for performing the method is also provided.

11 Claims, 3 Drawing Sheets

METHOD AND AN APPARATUS FOR RECOVERY OF METALS

This application claims the benefit of International Application Number PCT/SE01/00947, which was published in English on Nov. 15, 2001.

FIELD OF INVENTION

The present invention relates generally to a method and an apparatus for recovery of metals and more particularly for recovery of metals from metallic fines.

BACKGROUND

Large amounts of metallic dust, powder or fines are created in different processes in metallurgic industry, among other things from disintegration and screening. Another area in which metallic fines are collected is in gas filters or wet scrubbers, for example. The handling and recovery of these fines are often difficult and costly problems. The pressure from both public authorities and customers to find new solutions is constantly increasing. The earlier solution of landfilling is no longer a feasible solution and is in many countries illegal. Existing techniques for conversion and recovery are costly.

From an economical and environmental point of view, recovery is often a preferred solution to the above-mentioned problem of taking care of the dust. However, recovery often means some kind of external processing, resulting in transportation to plants and processes lying beside the normal chain of processes.

It is very difficult to return dust or fines directly to a furnace because its tendency to burn. Furthermore, due to the low weight of dust and fines, they are easily carried away by the gas to be mixed with the exhaust from the furnace, thus lowering the yield and constituting an environmental hazard.

A known solution to these problems is pelletization or briquetting of the dust or fines for subsequent feeding to a furnace. However, this solution is accompanied with the problem of extra costs for a separate plant for pelletization and binding agent.

In the case the fines are intermixed in a sludge or slurry, such as when the fines are recovered from wet scrubbers, there is a problem of extra costs for a separate plant for drying and the waste material.

Processes for the recovery of metals are described in the patent documents EP-A1-0618419, U.S. Pat. No. 5,108,496, U.S. Pat. No. 6,001,148, and JP 8295956. However, all these documents relates to processes wherein the starting material comprises non-metallic material, such as oxides.

SUMMARY OF THE INVENTION

An object of the present invention is to provide a method and an apparatus for recovery of metals from metallic fines in which the above-mentioned drawbacks with known techniques are avoided or at least mitigated.

The invention is based on the realisation that metallic fines normally have a known composition and therefore fines in metallic form can be returned directly to a process without essentially altering the chemical composition of the fines, including avoiding oxidation as far as possible, thus enabling the creation of an effective internal cycle of operations.

According to a first aspect of the present invention there is provided a method for recovering of metals as defined in claim 1.

With the method and the apparatus according to the invention, the problems of prior art are overcome or at least mitigated.

By using an oxygen-enriched gas with a burner, the melting process can be controlled in a satisfying way, avoiding burning of the fines supplied to the burner. Also, with the inventive method and burner arrangement, it has unexpectedly been found that excessive oxidation of the resulting product can be avoided, thereby enabling recovery of metals in an easy and cost-efficient way.

BRIEF DESCRIPTION OF DRAWINGS

The invention is now described, by way of example, with reference to the accompanying drawings, in which.

DETAILED DESCRIPTION OF THE INVENTION

Figure 1:
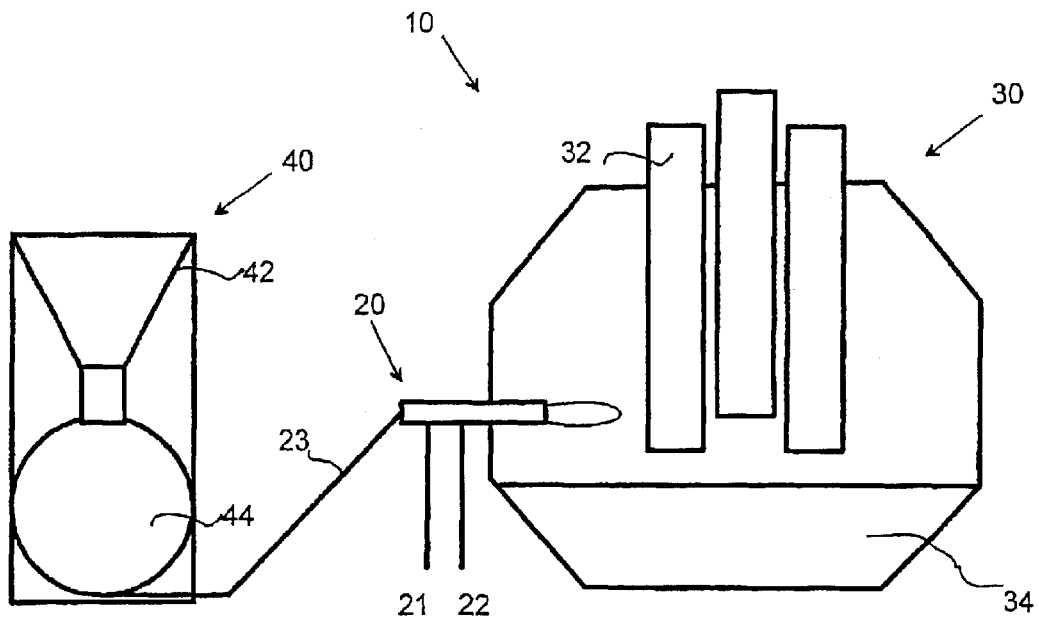
FIG. 1 is a schematic diagram of a plant according to the invention for recovery of metals from fines or dust.

In the following, a detailed description of the method and the apparatus according to the invention will be given. Starting with FIG. 1, an overall diagram of a plant for recovery of metals, generally designated 10, is shown. The plant is built around a burner 20 installed in a sidewall of a furnace 30. The burner is a so-called oxy-fuel burner and is thus supplied with fuel, such as fuel oil, propane, natural gas, or butane through a first feeding line 21 and with oxygen through a second feeding line 22. By oxygen is in this context meant a gas with an $O_2$ content exceeding 21% and preferably so-called technical oxygen having an $O_2$ content of 90–99.5%.

Fines or dust are supplied through a third feeding line 23. From the following description, it is clear that the inventive method is applicable to essentially metallic products with a diameter less than approximately 5 millimetres. Thus, both fines, normally meaning products resulting from crushing and sintering, and dust, normally meaning products collected in filters, are possible raw material for use with the inventive method as well as other equivalent materials, such as powder.

The burner 20 will be described in more detail below with reference to FIGS. 2 and 3.

The third feeding line 23 is also connected to a feeder, generally designated 40. The feeder 40 comprises a silo 42, into which metallic fines (shown in FIG. 4) are fed. The fines are directed from the silo 42 to a pressure vessel 44, from which they are further directed to the third feeding line 23 connected to the burner 20. By means of this arrangement, a desired supply rate of fines to the burner 20 is ensured.

In the exemplary plant shown in FIG. 1, the furnace 30 is a so-called electric arc furnace. This includes a number of electrodes 32 supplying the furnace with electric power used for melting the material in the furnace, as is conventional. Thus, in the bottom of the furnace there is gathered a charge 34 resulting from the material supplied to the furnace 30.

The burner 20 will now be described in detail with reference to FIGS. 2 and 3. The burner 20 comprises a main portion 24, to which the three supply lines 21–23 shown in FIG. 1 are connected. The portion 24 is provided with an essentially circular cross-section, see FIG. 3, in which the configuration of the supply lines 21–23 appears in more detail. Fuel is supplied through the first supply line 21 in the form of six equidistant pipes 21a–f placed on a constant distance from the centre axis of the main portion 24. Oxygen is supplied through an annular outer portion 22 and thus surrounds the fuel supplied through the pipes 21a–f. Finally, fines are supplied through the pipe 23, which is co-axially placed in the burner.

As already mentioned, the burner 20 is mounted in the sidewall of the furnace 30. In the preferred embodiment, the burner can be tilted, i.e., can be positioned in different angles relative to the horizontal and the vertical. The different orientations can be used for obtaining desired characteristics for the melting process.

In the following, the method for recovering metals will be described in detail.

Figure 4:
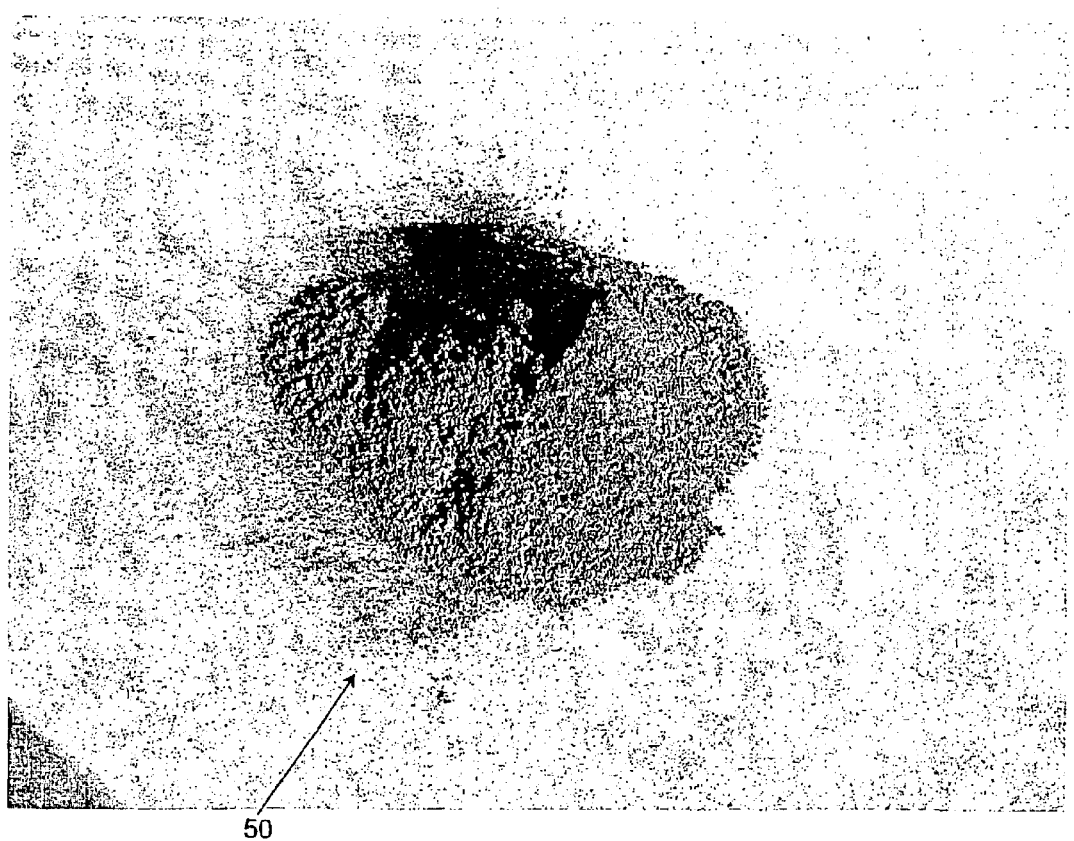
FIG. 4 shows dust of fines used with the method according to the invention.

Initially, fines are supplied to the silo 42 of the feeder 40. The fines used in the described process, see FIG. 4, are metallic particles in metallic form with low oxide content. The fines normally have a diameter of less than one millimetre and can be for example of ferro-silicon, ferro-chromium, or iron powder.

The fines fall from the silo and into the pressure vessel 44, wherein the pressure is maintained by means of a gas also functioning as a carrying gas, such as compressed air, nitrogen or argon. By means of the pressure in the pressure vessel 44, the fines are then carried to the oxy-fuel burner 20 at a rate, which is determined by the pressure level in the vessel 44, the amount of fines in the silo 42 etc. In an exemplary plant, the injection and melting has been at a rate of 3.5 tonnes per hour in an electrical arc furnace and the melted fines have been a perfect replacement for other raw materials, such as scrap and alloy additions.

The operation of the oxy-fuel burner 20 is controlled by means of the amount of fuel and oxygen supplied through the first and second supply lines 21 and 22, respectively. The supply lines are connected to sources of fuel and oxygen (not shown), as is conventional.

The operation of the burner 20 will now be described in detail with reference to FIGS. 2 and 3. Fines are supplied through the central feeding pipe 23 at a rate that is controlled by the feeder. Fuel is supplied in the six fuel feeding pipes 21a–f, see FIG. 3, while an envelope of oxygen is supplied through the annular feeding area 22. The oxy-fuel mixture results in a flame 25 having properties, such as length, temperature etc., that are controlled by the supply rate of fuel and oxygen. The higher oxygen content, the higher temperature, resulting in a theoretical flame temperature of 1900–2500° C. Thus, the fines are injected into the central portion of the flame 25.

Figure 2:
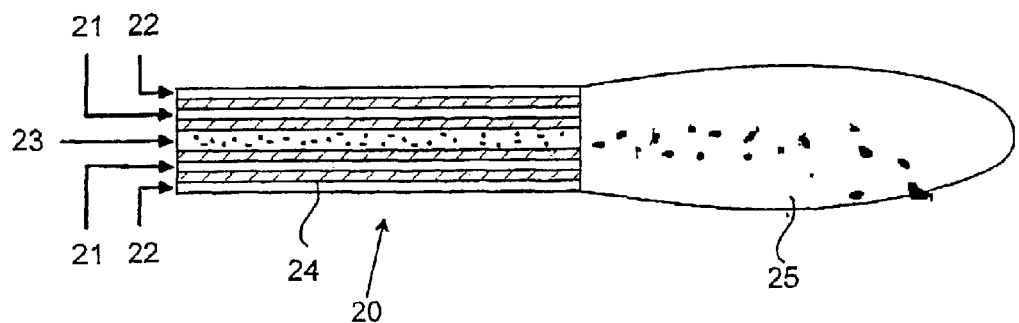
FIG. 2 is a sectional view of a burner used with the method according to the invention.
Figure 3:
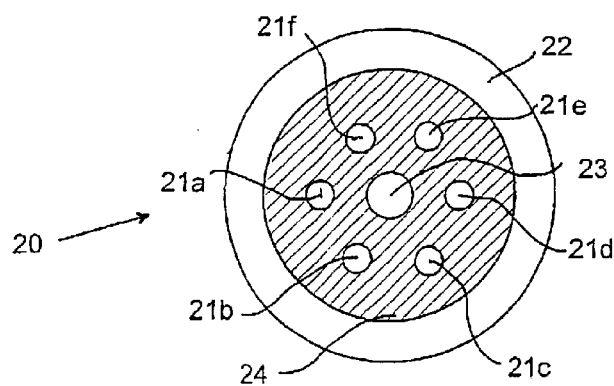
FIG. 3 is a cross-sectional view of the burner shown in FIG. 2.
Figure 5:
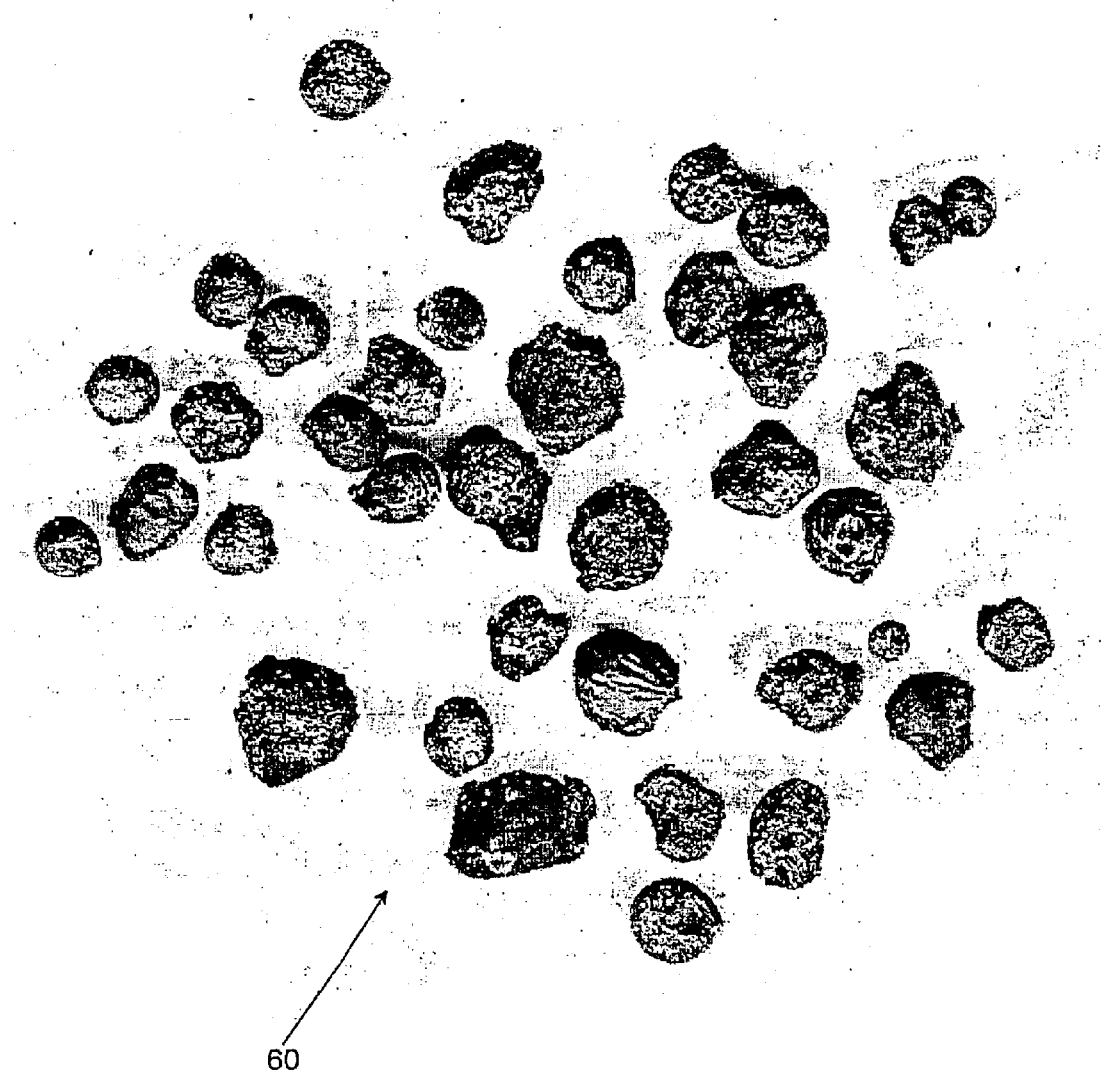
FIG. 5 shows agglomerate resulting from the method according to the invention.

As is seen from FIG. 2, the fines injected into the flame 25 are brought to agglomerate, thus creating agglomerates 60 of a larger size than the fines supplied to the burner. During some experiments performed with the inventive method, a typical size of the agglomerates was 3–8 millimetres, see FIG. 5, which shows ferro-chromium agglomerates 60 produced by means of the inventive method from dust or fines with a diameter of less than 1 millimetre.

The agglomeration process is controlled by means of several parameters, of which can be mentioned: temperature and velocity of the flame 25, energy content or density of the injected fines, stochiometry, i.e., the ratio oxidising gas to added fuel, the oxygen content of the oxidising gas, the supply rate of oxygen and added fuel, the rate of injection of fines and their characteristics, the travel time of the fines in the flame, and burner characteristics and configuration, such as tilting.

In order to minimise oxidation of the fines, melting of the injected material should be minimised. Thus the flame is preferably controlled so as just the surface of the fines injected through the burner is brought to melt. It is believed that this promotes the agglomeration process, i.e., fines with liquid surfaces tend to stick together, thus creating the desired agglomerates. It is also believed that the fuel partially shields the fines from oxygen, thus reducing the level of oxidation.

The created agglomerates fall to the bottom of the furnace 30, wherein they are added to the charge 34. The heat from the furnace brings the agglomerates to melt, thus converting them into useable form.

An advantage with the method according to the invention is that the level of oxidation of the fines is very low. One possible reason for this can be that the fines are shielded from the oxygen by the carrying gas, which preferably has a low oxygen content, i.e., less than 21%.

A preferred embodiment of the method and the apparatus according to the invention has been described. The person skilled in the art realises that this can be varied within the scope of the appended claims. Thus, although an oxy-fuel burner 20 has been shown, other equivalent burners, such as plasma burners, can be used as long as desired oxygen levels exceeding 21% are obtained.

Furthermore, an electric arc furnace 30 has been shown. The method according to the invention is equally applicable to other kinds of furnaces, such as induction furnaces, reverberatory furnaces, and electrically heated furnaces.

Fines and dust with a diameter of up to one millimetre have been described as the material supplied to the furnace. However, metallic particles with a diameter of up to 5 millimetres are conceivable.

Although in the description the fines are said to only partly melt it is also possible with a complete melting thereof, as long as the desired agglomerates are obtained without essentially altering the chemical composition of the supplied metallic material, i.e., with low or no oxidation.

Also, in the described embodiment, the burner is positioned in a sidewall of a furnace. However, it is realised that other suitable positions are possible, such as in the upper part of the furnace. Also, a configuration with more than one burner is also possible.

In the described embodiment, the fines are fed to the furnace by means of a feeder. However, the fines supplied to the furnace could also be free-flowing, carried by means of a feed gear etc.

A dry starting material has been shown in the figures. In the case the fines are intermixed in a liquid, such as water or sludge, a suitable feeding arrangement must be provided, comprising a feed screw, for example. Also, when arriving to the furnace, the wet part is vaporised by the high temperature of the flame, resulting in exhausts rising through the furnace 30 and subsequently leaving through an exhaust outlet (not shown). The fines are then brought to agglomerate in the above-described way.

What is claimed is:

1. A method for recovery of metals from essentially metallic fines, comprising the following steps:
   a) supplying said essentially metallic fines (50) to a flame (25) of an oxy-fuel burner (20), b) bringing said fines to agglomerate by means of heat from said flame (25) without essentially changing the chemical composition thereof, thereby providing an essentially metallic agglomerated product (60), and c) recovering said agglomerated product (60).

2. The method according to claim 1, wherein said burner is supplied with an oxidising gas having an $O_2$ content of at least 21% $O_2$.

3. The method according to claim 2, wherein said burner is supplied with an oxidising gas having an $O_2$ content of at least 90% $O_2$.

4. The method according to any of claims 1–3, wherein said metallic fines (50) are ferro-silicon, ferro-chromium, or iron powder.

5. The method according to claim 1, wherein said metallic fines (50) have a diameter of less than approximately 5 millimeters, and more preferably a diameter of less than approximately 1 millimeter.

6. The method according to claim 1, wherein the step c) of recovering said agglomerated product (60) comprises feeding said product to a furnace.

7. The method according to claim 1, wherein the recovering of step c) is performed in one of the following furnace types: an electric arc furnace, an induction furnace, a reverberatory furnace, or an electrically heated furnace.

8. The method according to claim 1, wherein the agglomeration process of step b) is controlled by means of at least some of the following parameters: temperature and velocity of said flame (25), energy content or density of said fines (50), the ratio oxidising gas to added fuel of said burner (20), the oxygen content of said oxidising gas, the supply rate of oxygen and added fuel, the supply rate of said fines and their characteristics, the travel time of said fines in said flame, and burner characteristics and configuration, such as tilting.

9. The method according to claim 1, wherein at the agglomeration process of step b) is controlled so at least some of said fines (50) are only partly melted.

10. The method according to claim 1, wherein step a) comprises supplying said (50) essentially to the central portion of said flame (25).

11. The method according to claim 1, wherein said fines are intermixed in a liquid, and wherein step b) comprises bringing said liquid part to vaporise by means of said flame.

* * * * *

UNITED STATES PATENT AND TRADEMARK OFFICE
CERTIFICATE OF CORRECTION

PATENT NO. : 6,989,043 B2
DATED : January 24, 2006
INVENTOR(S) : Gripenberg et al.

It is certified that error appears in the above-identified patent and that said Letters Patent is hereby corrected as shown below:

Title page,
Item [30], Foreign Application Priority Data, delete "May 3, 2000" and insert -- May 5, 2000 --.

Column 6,
Line 17, after "said" insert -- fines --.

Signed and Sealed this

Second Day of May, 2006

JON W. DUDAS
*Director of the United States Patent and Trademark Office*